United States Patent Office 3,314,570
Patented Apr. 18, 1967

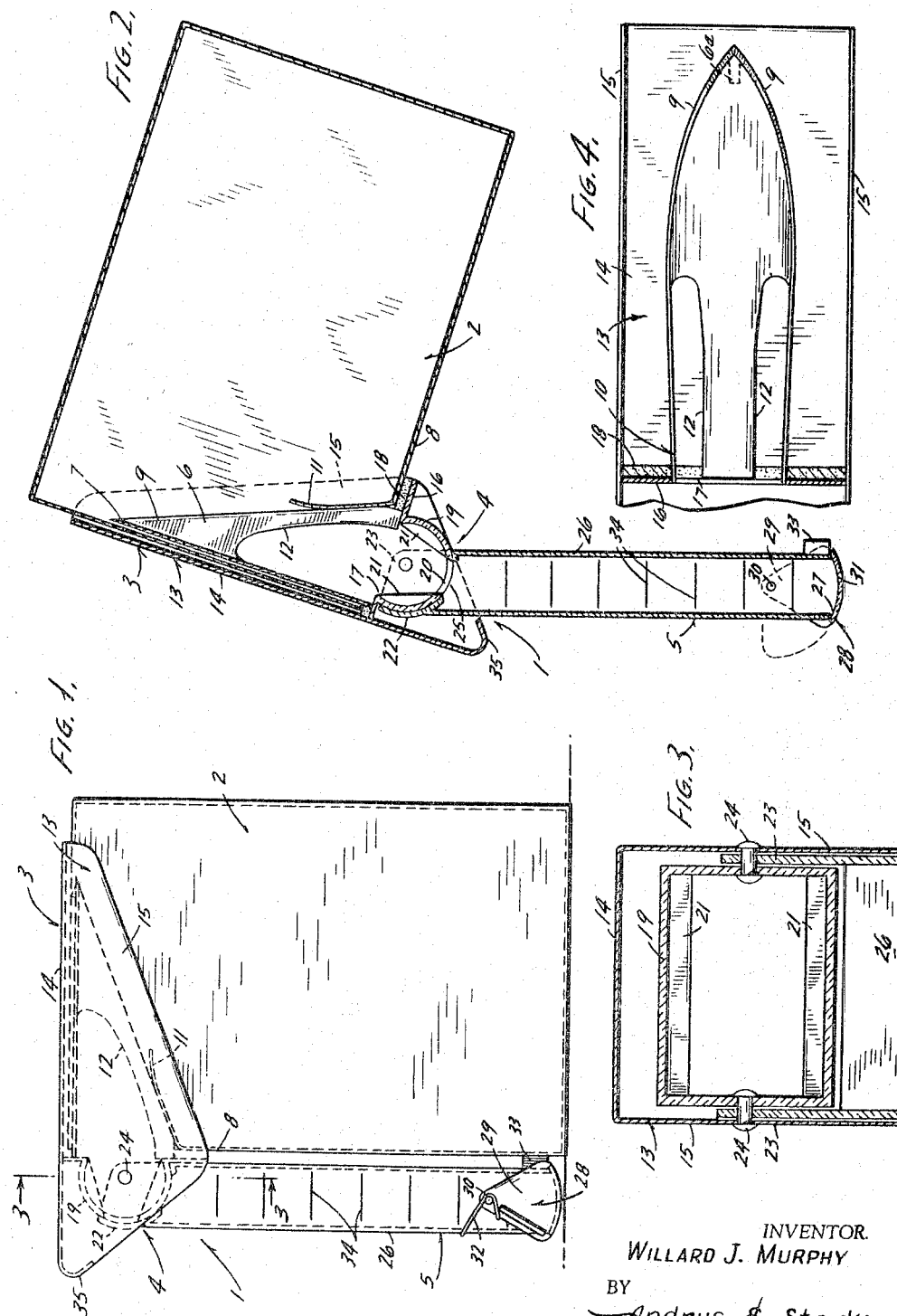

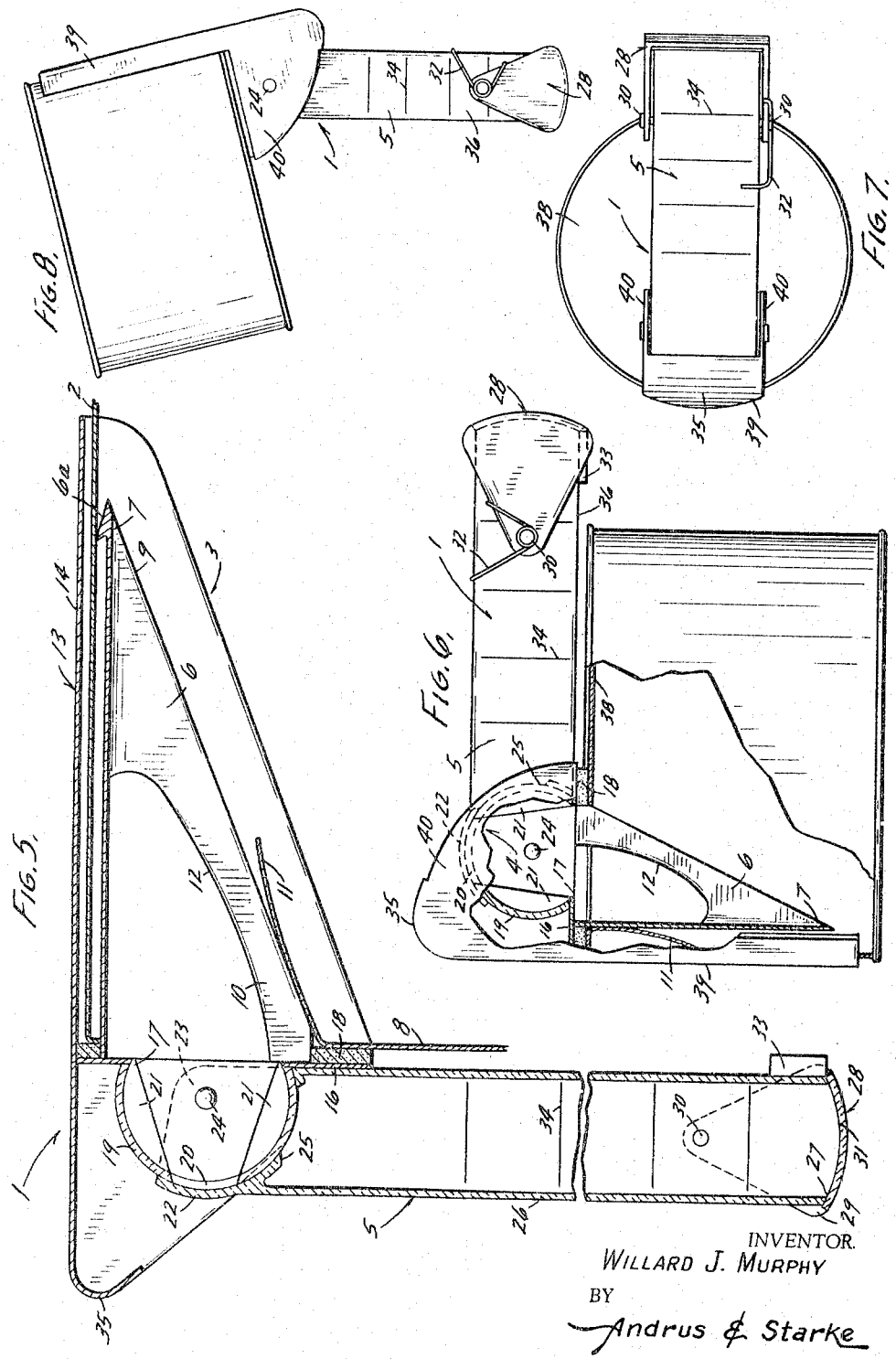

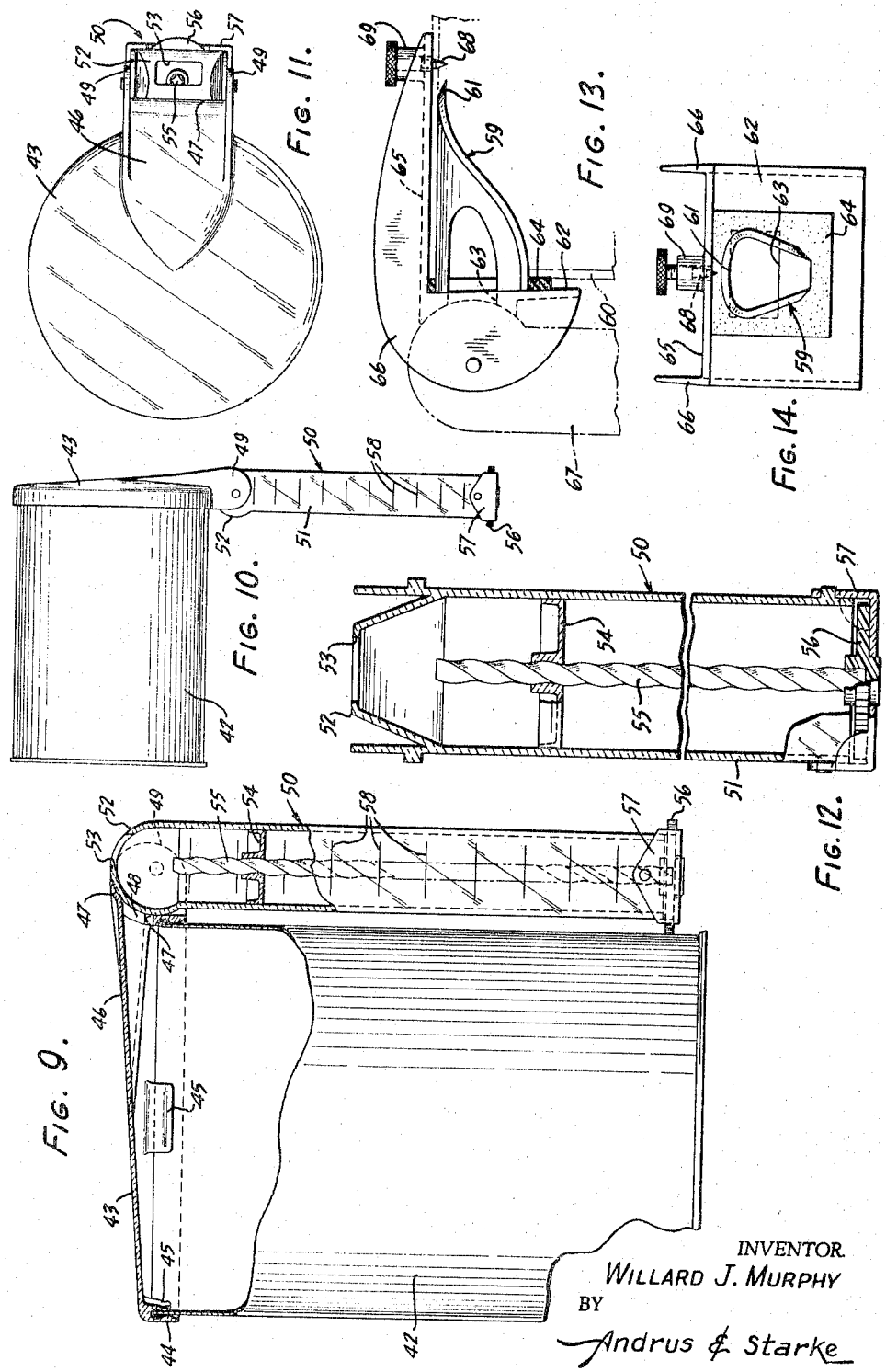

3,314,570
FLUID MATERIAL DISPENSING APPARATUS HAVING A CONTAINER PIERCING MEANS AND A MATERIAL MEASURING RECEPTACLE
Willard J. Murphy, 605 E. Harvey St., Ely, Minn. 55731
Original application Aug. 27, 1963, Ser. No. 305,577, now Patent No. 3,241,728, dated Mar. 22, 1966. Divided and this application June 14, 1965, Ser. No. 463,629
3 Claims. (Cl. 222—88)

This application is a division of application Ser. No. 305,577, filed Aug. 27, 1963, now Patent No. 3,241,728 which in turn was a continuation-in-part of application Ser. No. 201,583, filed June 11, 1962, now abandoned.

This invention relates to a dispensing apparatus and more particularly to a dispensing apparatus associated with a container and adapted to measure and dispense a quantity of the contained material.

Soap, bleach and other granular or powdered materials are generally packaged in a paper or cardboard box. To dispense the contained material, a tab is removed from the top or end walls of the box and the contents are poured out for use. Normally, there is no accurate metering or control of the flow of the material from the box so that it is difficult to measure out precise amounts of material. After removal of the tab, the opening in the box is normally not closed and if the box is accidentally tipped over or dropped, the material will spill. Moreover, with the tab removed, the contents of the box is exposed to the air and moisture which may cause hygroscopic material to pick up moisture and become lumpy, or in some cases may cause deterioration of the materials.

The same general problems apply to food products, such as coffee, which is sold in hermetically sealed cans and is generally dispensed by using a small measuring cup. Again, this type of measuring and dispensing is not too accurate and results in considerable spillage.

The present invention is directed to a dispensing apparatus which is permanently applied to the container without opening the container in the normal manner. More specifically, the dispensing apparatus includes a piercing mechanism having a sharpened point which is adapted to pierce and punch an opening in the container. A measuring unit is pivotally connected to the piercing member and a valve mechanism provides communication between the punched opening in the container and the measuring unit and serves to control the flow of material from the container to the measuring unit.

The measuring unit includes a transparent, graduated receptacle or cup which receives the material, and the receptacle is provided with a discharge opening enclosed by a movable door or gate.

The dispensing apparatus is initially applied to the container by driving the piercing member through a wall of the container. In this position the valve is closed so that there can be no flow of material into the measuring unit even if the container is tilted or tipped. When it is desired to dispense a quantity of the contained material, the box and piercing member are pivoted with respect to the measuring receptacle. The pivotal movement opens the valve and permits material to flow downwardly into the measuring receptacle or cup. When the desired amount of material has been poured into the receptacle, the piercing member and container are pivoted back to their original position which closes the valve and stops further flow of material into the measuring receptacle. The door or gate on the measuring receptacle is then opened to discharge material to the location of use.

With the invention, it is not necessary to open the box or container in the normal manner. The piercing member provides the only opening into the container and this opening is normally closed by the valve unit. As the container is normally closed, there will be no spilling of the contained material if the box or container is accidentally spilled and the contents of the box will not be exposed to the air or moisture.

The valve unit provides a very accurate metering device in which small quantities of material can be precisely measured. As the container is provided with graduations, the use of an auxiliary measuring cup is eliminated.

In a modified form of the invention, the dispensing mechanism includes a cover which is adapted to fit over and enclose the open end of the can, such as a coffee can. A measuring unit is pivotally connected to the cover and a valve mechanism provides communication between an opening in the cover and the measuring unit and serves to control the flow of material from the can or container to the measuring unit.

In this embodiment a mechanism is employed to automatically pre-set the amount of material to be poured into the measuring unit. A tray is mounted within the measuring unit and is threaded to a screw which extends the length of the measuring unit. By rotating the screw, the tray can be moved throughout the length of the measuring unit to thereby pre-set the amount of material to be introduced into the measuring unit.

Other objects and advantages will appear in the course of the following description.

The drawings illustrate the best mode presently contemplated of carrying out the invention.

In the drawings:

FIG. 1 is a side elevation of the dispensing apparatus as applied to a cardboard box;

FIG. 2 is a view similar to FIG. 1 in which the box and piercing member have been pivoted with respect to the container to permit material to flow into the measuring receptacle;

FIG. 3 is a sectional view taken along line 3—3 of FIG. 1;

FIG. 4 is an enlarged fragmentary view showing the piercing member or spear;

FIG. 5 is an enlarged transverse section of the dispensing apparatus as applied to the cardboard box;

FIG. 6 is a side elevation with parts broken away of a modified form of the dispensing apparatus as applied to a coffee can;

FIG. 7 is a plan view of the embodiment shown in FIG. 6;

FIG. 8 is a view similar to FIG. 6 showing the pouring position of the apparatus;

FIG. 9 is a side elevation with parts broken away in section showing a second modified form of the invention in which the dispensing mechanism includes a cover to enclose the can;

FIG. 10 is a view of the apparatus shown in FIG. 9 in which the material is being poured from the can into the measuring unit;

FIG. 11 is a plan view of the structure shown in FIG. 9;

FIG. 12 is a side elevation of the measuring unit with parts broken away in section;

FIG. 13 is a fragmentary side elevation of a third modified form of the invention as applied to a cardboard container; and FIG. 14 is an end view of the piercing mechanism of the device shown in FIG. 13.

FIGS. 1–5 illustrate a dispensing apparatus 1 to be used with a box 2 containing a granular, powdery or flaky material, such as soap, bleach or the like.

The dispensing apparatus comprises, in general, a piercing mechanism 3 which is adapted to pierce the box, a valve unit 4 which controls the flow of the material and a measuring unit 5 which measures out and dispenses a given quantity of the material.

The piercing mechanism 3 includes a spear 6 or piercing member having a pointed tip 7 which is adapted to pierce the end wall 8 of the box 2. In cross section, the spear 6 is generally curved or U-shaped and the longitudinal edges 9 extending from the tip are sharpened in order to cut the box and prevent tearing or ripping of the same. The base portion 10 of the spear 6 is narrowed down in width and serves to hold open the flap 11 of the end wall of the box which was cut by the spear 6.

To prevent the spear 6 from slipping out of the box, the upper surface of the spear may be provided with a barb or hook 6a which engages the upper surface of the box.

The base portion of the spear 6 is also provided with a pair of large openings 12 through which the material within the box flows as it is being dispensed.

To maintain alignment of the dispensing apparatus with respect to the box 2, a hood 13 is located outwardly of the spear and includes a top wall 14 positioned against the top of the box and a pair of side walls 15 which engage the side walls of the box. In adidition, the hood 13 includes an end wall 16 which connects the side walls and is adapted to bear against the end wall 8 of box 2. The end wall 16 is provided with an opening 17 which is aligned with the opening pierced in the end wall 8 by the spear 6 so that the material will flow outwardly through the aligned openings.

To prevent leakage of the material around the opening 17, a resilient or flexible seal 18 is secured to the inner surface of the end wall 16 bordering the opening 17. The seal 18 bears against the outer surface of the end wall 8 of the box and prevents leakage of the granular or other material between the end wall and the corresponding surface of the box.

The valve unit 4 which meters the material from the box includes a semi-cylindrical valve member 19 which is secured to end wall 16 and is provided with an outlet opening 20. A pair of baffles 21 are secured to the inner surface of the valve member 19 and serves to direct the material toward the opening 20. The baffles 21 are particularly useful when dealing with a fine powdered material and prevent the material from lodging on the cylindrical surface of valve member 19 bordering the opening 20.

The valve member 19 is located within an outer semi-cylindrical valve member 22 and the valve member 22 is provided with a pair of projecting side walls 23 which are pivotally connected to the side walls 15 of hood 13 by rivets 24. By virtue of this pivotal connection, the valve member 22 can be pivoted or moved with respect to valve member 19. The member 22 is provided with an opening 25 of similar size to opening 21 in valve member 19 and by rotating or pivoting the valve member 22 with respect to valve member 19, the openings 25 and 20 can be brought into alignment so that material will pass through the openings to the measuring unit 5.

The edges of the valve members 19 and 22 defining the openings 21 and 25 are beveled, as best shown in FIGS. 2 and 5. The beveled edges deflect the contained material away from the joint between the valve members 19 and 22 and prevent the contained material from entering the joint and impeding the rotation of the valve members 19 and 22.

The measuring unit 5 includes an elongated plastic container 26 which is formed integrally with the valve member 22. The lower end of the container 26 is provided with an outlet opening 27 which is adapted to be closed off by a swinging gate 28 having side flanges 29 pivotally attached to opposite end walls of container 26 by pins 30. The lower edge 31 of the container is rounded and the gate 28 has a corresponding generally curved contour so that it may readily swing or pivot between an open and closed position.

The gate 28 is urged to the closed position by a spring 32, one end of which bears against the edge of the side flange 29 and the other end of which bears against the side outer wall of container 26. The gate 28 is maintained in a closed position by a stop 33 which is secured to the inner side wall of the container and limits the inward movement of the gate.

The container 26 is made of a transparent material and is provided with a series of graduations 34.

In operation, the dispensing apparatus 1 is initially attached to the box 2 by pushing or driving the tip of the spear 6 through the end wall 8 of the box. To facilitate piercing of the box, the outer end hood 13 is rounded, as indicated at 35, and the hand can bear against this rounded portion to drive the spear into the end wall 8 of the box.

The normal non-dispensing position is shown in FIGS. 1 and 5 and in this position the openings in valve members 19 and 22 are out of alignment so that no material can flow out of the box. This prevents the material from spilling in the event the box is accidentally tipped or dropped.

When it is desired to measure out a quantity of soap or other material contained within the box, the box 2 and the hood 13 are pivoted upwardly which opens the valve unit 4 and permits a quantity of material to flow downwardly into the measuring container 26, as shown in FIG. 2. The greater portion of the material flows in the space between the side edges of the spear 6 and the side walls of the box, and then through openings 12 to box openings 17. When the desired quantity of material has been poured into the container as determined by the graduations 34, the hood 13 and box 2 are pivoted downwardly to close the valve unit. The gate 28 is then opened, permitting the measured quantity of material to be discharged into the washing machine or other location of use.

The box and hood 13 can be pivoted at least 90° with respect to the container 26 and generally in the range of 90° to 120°. The upward pivotal movement of the hood is limited by the engagement of the upper edge of valve member 22 with the end wall 16, while the downward pivotal movement is limited by the engagement of the inner side surface of container 26 with end wall 16.

The present invention is applied directly to the box without opening the box top, and the only opening required is the flap which is punched out by the spear 6. As the top of the box is not opened, and the only opening in the box is normally closed off by the valve unit 4, the material within the box will not be exposed to the air or moisture and this aids in preserving the desired physical characteristics of the contained material. Moreover, there will be no spillage of the material if the box is accidentally tipped over or mishandled.

The valve unit 4 provides a very accurate metering control for the flow of material from the box, and the transparent container provides a visual measurement of the material and eliminates the use of a measuring cup.

FIGS. 6–8 show a modified form of the invention in which the dispensing apparatus 1 is associated with a coffee can or the like. In this embodiment, the dispensing apparatus includes a piercing mechanism having a pointed spear 6 which pierces the cover 38 of the can.

In this embodiment, a hood 39, which corresponds to hood 13 of the first embodiment is secured to the spear 6 and is provided with side flanges 40 which are pivotally connected to the measuring unit 5. However, due to the curved nature of the wall of the coffee can, the hood 39 is curved to complement the curvature of the can. The valve unit 4 and measuring unit 5 correspond in structure and function to that of the first embodiment.

In use of the apparatus shown in FIGS. 6–8, the tip of the spear 6 is engaged with the cover 38 of the can and by pushing on the rounded end 41 of the hood 39, the spear will penetrate through the cover 38 until the seal 18 engages the outer surface of the cover.

To dispense a given quantity of coffee or other material contained within the can, the hood 39 and can are tilted upwardly as shown in FIG. 8, which opens the valve mechanism 4 and allows the contents of the can to pour downwardly into the transparent measuring receptacle 36. When the desired quantity of material has been introduced into the receptacle, the can and hood are pivoted downwardly to close the valving mechanism. The coffee or other material within the measuring receptacle can then be discharged into the coffee pot or other location of use by opening the gate or door 28.

As in the case of the first embodiment, the dispensing apparatus, as shown in FIGS. 6–8, is applied to a coffee can or other hermetically sealed container without otherwise opening the can. During periods of non-use, the valve mechanism 4 is closed so that the contents of the can are not exposed to the air or atmosphere and thus the coffee or other material within the can will retain its flavor and aroma for extended periods. The contained material can be readily measured out and dispensed without spilling, and the valve mechanism provides a very accurate and positive means of metering the material into the graduated receptacle.

FIGS. 9–12 show a second modified form of the dispensing apparatus adapted to be applied to a can 42, such as a coffee can. While the structure shown in the first embodiment included a piercing member which was adapted to pierce the container, the dispensing mechanism shown in FIGS. 9–12 includes a cover 43 which is adapted to enclose the open end of the can 42. The cover 43 is preferably formed of a flexible material, such as plastic, and is provided with a downwardly extending peripheral flange 44. The cover is held to the can by a series of tabs 45 which are located inwardly of the flange 44 and serve to engage the upper edge or bead of the can.

The cover 43 is provided with a chute or extension 46 which extends to the periphery of the cover and the chute 46 terminates in a pair of rounded edges 47 which define an opening 48. In addition, a pair of projecting flanges 49 extend outwardly from the chute 46 and a measuring unit 50 is pivotally connected to the flanges 49.

As best shown in FIGS. 9–12, the measuring unit 50 includes a transparent measuring container 51, the upper end of which is provided with a rounded surface or head 52 adapted to rotate against the curved edges 47 bordering opening 48. Head 52 is provided with an opening 53. As shown in FIG. 9, the opening 48 in the chute 46 is not in alignment with the opening 53 when the measuring container 51 is located adjacent the wall of the can 42. When it is desired to pour material from the can 42 into the measuring container 51, the can is pivoted relative to the container 51 which causes the opening 48 to be rotated into alignment with the opening 53 and the material can then flow, as shown in FIG. 10, through the chute 46 and aligned openings 48 and 53 into the measuring container 51. When it is desired to pour the material from the measuring container, the can is tilted back to the position shown in FIG. 9 to thereby expose the opening 53, and the material can then be poured from the measuring container through the opening 53.

In this embodiment, a mechanism is provided for accurately pre-setting the amount of material poured into the measuring container 51. This is accomplished by a movable tray 54 which is threaded on a screw 55. The tray is rectangular in shape and generally corresponds to the cross sectional contour of container 51. The screw extends from the bottom of the measuring container 51 to the head 52, and the lower end of the screw is attached to a knob 56. The periphery of the knob 56 extends outwardly beyond the walls of the measuring container and, the lower end of the measuring container 51 is enclosed by a base member 57 having recesses through which the knob 56 extends. In order to indicate the amount of material to be poured into the container, the walls of the container are provided with a series of graduations 58. With this structure, the knob 56 is rotated until the tray 54 is located at the graduation 58 indicating the desired amount of material to be received within the measuring container 51.

The can 42 is then pivoted to bring openings 48 and 53 into alignment and the material is poured from the can into the portion of container 51 above tray 54. When this portion of the container 51 is filled, the can is pivoted back to its original position to thereby expose opening 53 and the contents of the container 51 can then be poured out of the container.

The structure shown in FIGS. 9–12 includes an integral cover which is adapted to enclose the open end of a coffee can or other similar container. This device eliminates piercing of the container and can be readily applied to standard size cans. In addition, the use of the movable tray 54 enables an accurate or precise amount of the material to be measured directly into the measuring container 51. The use of the hand knob 56 and screw 55, allows the tray 54 to be quickly and easily moved to set the amount to be measured and dispensed.

In addition, the dispensing device provides a smooth flow of material and eliminates stacking and can be readily cleaned. Moreover, the device is compact for the measuring unit is normally pivoted against the side wall of the can so that the overall size of the can and dispensing apparatus is not much greater than the size of the can alone.

FIGS. 13 and 14 illustrate a further modified form of the invention in which the dispensing mechanism is adapted to be applied to a cardboard box or container 60. In this case, the dispensing apparatus includes a piercing unit 59 having a spear 61 which is similar in structure and function to spear 6 of the first embodiment. The spear 61 extends outwardly from end wall 62, and the wall 62 is provided with an opening 63 which is in alignment with the opening cut in the box by the spear. The end wall 62 is spaced from the wall of the container by the resilient pad 64 and the end wall 62 defines a pair of rounded edges bordering the opening 63.

The piercing unit 59 is also provided with a top wall 65 which is adapted to bear against the upper surface of the container 60 and a pair of side walls 66. In this embodiment, the side walls 66 extend upwardly and outwardly from the spear and are not adapted to straddle the side walls of the container as in the first embodiment.

A measuring unit 67 is pivotally connected to the side walls 66 and is identical in structure and function to measuring unit 50 previously described.

In order to prevent lateral movement of the spear within the box 60, a pin 68 is threaded within a boss 69 located on top wall 65. By threading the sharpened pin 68 downwardly through the top wall of the box 60, lateral movement of the dispensing device is prevented.

The structure of FIGS. 13 and 14 can be readily adapted for use with any cardboard container regardless of its width, and the pin 68 will permit lateral movement of the device with respect to the box.

Various modes of carrying out the invention are contemplated as being within the scope of the following claims particularly pointing out and distinctly claiming the subject matter which is regarded as the invention.

I claim:

1. A dispensing apparatus for use with a container containing a material to be dispensed, comprising piercing means including a spear having a sharp tip to pierce the container and provide a discharge opening in a wall thereof, said piercing means including an end wall located at the base of the spear and having an outlet opening therein adapted to communicate with the discharge opening in the wall of the container, said end wall being adapted to be positioned in engagement with the end wall of the container bordering the discharge opening therein, a hood including a top wall disposed in spaced, generally parallel relation to the spear and located generally normal to the end wall and adapted to engage the top wall of the container, said hood also including a pair of side walls connected to the top wall and adapted to embrace the side walls of the container, a receptacle pivotally connected with respect to the piercing means and having an inlet opening therein disposed to communicate with the outlet opening in the end wall, valve means disposed between the outlet opening in the end wall and inlet opening in the receptacle for controlling the flow of material from the container into said receptacle, and means for removing the material from the receptacle.

2. A dispensing apparatus for use with a container containing materials to be dispensed, comprising a spear having a sharpened tip to pierce the container and provide a discharge opening in the wall thereof, an end wall located at the base of the spear and having an outlet opening therein adapted to communicate with the discharge opening in the container, a hood connected to the base of the spear and including a top wall located generally normal to the end wall and extending in generally parallel spaced relation to the spear, said top wall adapted to engage the top wall of the container, said hood also including a pair of side walls extending generally perpendicular to the top wall and disposed to embrace the side walls of the container, a receptacle pivotally connected with respect to the spear and having an inlet opening disposed in communication with the discharge opening in the end wall, valve means disposed between said opening in the end wall and the inlet opening in said receptacle for controlling the flow of material into said receptacle from the container, and means connected to the outer end portion of the spear and extending from the spear toward said hood and disposed to engage the inner surface of the container to prevent free withdrawal of the spear from the container.

3. The dispensing apparatus of claim 2 in which the base of the spear is provided with a series of holes through which material can flow to the outlet opening in said end wall.

References Cited by the Examiner
UNITED STATES PATENTS

| | | | |
|---|---|---|---|
| 1,472,112 | 10/1923 | Barrows | 222—438 |
| 2,099,323 | 11/1937 | Wiswell | 222—83 |
| 2,115,033 | 4/1938 | Mitchell | 222—81 |
| 2,159,259 | 5/1939 | Dootson | 222—445 X |
| 2,354,518 | 7/1944 | Halstead | 222—81 |
| 2,613,851 | 10/1952 | Du Bois | 222—81 |
| 2,650,739 | 9/1953 | Boydstun | 222—82 |
| 2,778,532 | 1/1957 | Raverty et al. | 222—89 |
| 2,877,932 | 3/1959 | Whitmire | 222—83 |
| 3,089,620 | 5/1963 | Green et al. | 222—89 |

FOREIGN PATENTS

| | | |
|---|---|---|
| 1,017,963 | 10/1952 | France. |
| 553,615 | 12/1956 | Italy. |

WALTER SOBIN, *Primary Examiner.*